(12) United States Patent
Huh

(10) Patent No.: US 11,654,882 B2
(45) Date of Patent: May 23, 2023

(54) DEVICE FOR CONTROLLING DRIVING OF AN ELECTRIC FOUR-WHEEL DRIVE VEHICLE AT THE TIME OF SHIFT

(71) Applicants: Hyundai Motor Company, Seoul (KR); Kia Corporation, Seoul (KR)

(72) Inventor: Jee Wook Huh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/509,858

(22) Filed: Oct. 25, 2021

(65) Prior Publication Data

US 2022/0185261 A1 Jun. 16, 2022

(30) Foreign Application Priority Data

Dec. 10, 2020 (KR) ........................ 10-2020-0171888

(51) Int. Cl.
*B60W 20/10* (2016.01)
*B60W 10/06* (2006.01)
*B60W 10/08* (2006.01)
*B60K 6/52* (2007.10)

(52) U.S. Cl.
CPC ............... *B60W 20/10* (2013.01); *B60K 6/52* (2013.01); *B60W 10/06* (2013.01); *B60W 10/08* (2013.01); *B60W 2510/0666* (2013.01); *B60W 2510/085* (2013.01); *B60W 2510/1005* (2013.01); *B60W 2510/106* (2013.01); *B60W 2540/10* (2013.01); *B60W 2710/0677* (2013.01); *B60W 2710/086* (2013.01)

(58) Field of Classification Search
CPC .... B60W 20/10; B60W 100/06; B60W 10/08; B60W 2510/0666; B60W 2510/105; B60W 2710/0677; B60W 2710/086; B60W 10/196; B60W 2510/085; B60W 2540/10; B60W 2510/083; B60K 6/52
USPC .............................................................. 477/3
See application file for complete search history.

(56) References Cited

U.S. PATENT DOCUMENTS

| 6,319,168 | B1 | 11/2001 | Morris et al. | |
| 7,517,298 | B2* | 4/2009 | Ortmann | B60K 6/44 |
| | | | | 477/3 |
| 2001/0003109 | A1 | 6/2001 | Tabata | |
| 2005/0085980 | A1* | 4/2005 | Kawashima | B60K 6/52 |
| | | | | 701/53 |
| 2010/0167869 | A1 | 7/2010 | Falkenstein et al. | |
| 2019/0001962 | A1* | 1/2019 | Park | B60W 20/30 |
| 2019/0263385 | A1* | 8/2019 | Zhou | B60K 6/52 |
| 2020/0031216 | A1* | 1/2020 | Zhou | B60W 20/10 |

(Continued)

FOREIGN PATENT DOCUMENTS

| FR | 2994404 A1 | 2/2014 |
| JP | 2012-043683 A | 3/2012 |

OTHER PUBLICATIONS

English translation of FR2994404A1; http://translationportal.epo.org; Aug. 25, 2022 (Year: 2022).*

*Primary Examiner* — Roger L Pang
(74) *Attorney, Agent, or Firm* — Fox Rothschild LLP

(57) ABSTRACT

A device for controlling driving of an electric four-wheel drive vehicle at the time of shift is provided. The device controls driving of an electric four-wheel drive vehicle to minimize energy loss occurring on a power transmission path during shift, thereby improving fuel efficiency.

18 Claims, 6 Drawing Sheets

(56) References Cited

U.S. PATENT DOCUMENTS

2022/0055602 A1* 2/2022 Shin .................. B60W 20/10
2022/0111833 A1* 4/2022 Park .................. B60W 20/19

* cited by examiner

DEVICE FOR CONTROLLING DRIVING OF AN ELECTRIC FOUR-WHEEL DRIVE VEHICLE AT THE TIME OF SHIFT

CROSS-REFERENCE TO RELATED APPLICATION

This application claims, under 35 U.S.C. § 119(a), the benefit of priority to Korean Patent Application No. 10-2020-0171888 filed on Dec. 10, 2020, the entire contents of which are incorporated herein by reference.

BACKGROUND

(a) Technical Field

The present disclosure relates to a device for controlling driving of an electric four-wheel drive vehicle at the time of shift, and more particularly, to a device for controlling driving of an electric four-wheel drive vehicle that minimizes energy loss occurring on a power transmission path during shift to improve fuel efficiency.

(b) Background Art

As is well known, a hybrid vehicle, an electric vehicle, or a hydrogen fuel cell vehicle is equipped with an electric motor as a traveling driving source, and this vehicle is called an electrified vehicle. A powertrain having an engine and/or a front wheel motor connected to front wheels and a rear wheel motor, which is smaller than the front wheel motor, connected to rear wheels is applicable as an example of a four-wheel drive powertrain of the electrified vehicle.

For a four-wheel drive powertrain having an engine and a front wheel motor, which are main driving sources for vehicle traveling, connected to front wheels and a rear wheel motor, which is an auxiliary driving source, connected to rear wheels, a transmission is connected to the front wheel motor, and only a decelerator is connected to the rear wheel motor with no transmission being connected thereto.

In the four-wheel drive powertrain, shifting is inevitably performed, since the transmission is mounted therein. When shifting is performed during traveling using the front wheel motor and/or the engine connected to the transmission, shift loss occurs due to a ratio step between shift gears. Such shift loss acts as a factor that deteriorates fuel efficiency and thus causes a reduction in fuel efficiency.

The above information disclosed in this section is provided merely for enhancement of understanding of the background of the invention and therefore it may contain information that does not form the prior art that is already known in this country to a person of ordinary skill in the art.

SUMMARY

The present invention provides a device for controlling driving of an electric four-wheel drive vehicle capable of minimizing energy loss occurring on a power transmission path at the time of shift, thereby improving fuel efficiency.

The objects of the present invention are not limited to those described above, and other unmentioned objects of the present invention will be clearly understood by a person of ordinary skill in the art (hereinafter referred to as an "ordinary skilled person") from the following description.

In order to accomplish the object, in an aspect, the present invention provides a device for controlling driving of an electric four-wheel drive vehicle at the time of shift, the device may include a front wheel powertrain having an engine, a front wheel motor, and a transmission configured to shift powers of the engine and the front wheel motor and to output the shifted powers to front wheels, a rear wheel powertrain having a rear wheel motor and a decelerator configured to decelerate power of the rear wheel motor and to output the decelerated power to rear wheels, and a controller configured to, when shift of the transmission starts during traveling through driving of the engine, command the rear wheel motor to output the portion of driver demand power corresponding to power capable of being output by the rear wheel motor and to command the front wheel motor to output power obtained by subtracting the output power commanded to the rear wheel motor (i.e. rear wheel motor output power) and output power of the engine from the driver demand power (driver demand power−rear wheel motor output power−engine output power).

According to an exemplary embodiment of the present invention, the device has the following features.

First, when the sum of the maximum power capable of being output by the front wheel motor and the maximum power capable of being output by the rear wheel motor is less than the driver demand power during traveling, the controller may be configured to drive the engine and command the engine to output power determined according to an operating line map.

Second, when the driver demand power is greater than the maximum power capable of being output by the rear wheel motor at the time of shift, the controller may be configured to command the rear wheel motor to output the maximum power. At this time, the engine output power output by the engine, which corresponds to power obtained by subtracting the maximum rear wheel motor power from the driver demand power, may be output to the front wheels.

Additionally, when the sum of the maximum rear wheel motor power and the engine output power is greater than the driver demand power at the time of shift, the controller may be configured to command the front wheel motor to generate electricity for charging a battery, and the front wheel motor may be configured to generate electricity for charging the battery using power obtained by subtracting the maximum rear wheel motor power and the engine output power from the driver demand power. The battery may be connected to the front wheel motor and the rear wheel motor to be charged and discharged.

When the driver demand power is equal to or less than the maximum rear wheel motor power at the time of shift, the controller may be configured to command the rear wheel motor to output the driver demand power and command the front wheel motor to generate electricity for charging the battery. At this time, the front wheel motor may be configured to generate electricity for charging the battery using the engine output power.

Third, when no shift of the transmission is performed during traveling through driving of the engine, the controller may be configured to command the front wheel motor to output power obtained by subtracting the engine output power from the driver demand power.

At this time, when the driver demand power is less than the engine output power, the controller may be configured to command the front wheel motor to generate electricity for charging the battery, and the front wheel motor may be configured to generate electricity for charging the battery using power obtained by subtracting the engine output power from the driver demand power. Additionally, when the driver demand power is greater than the engine output power, the controller may be configured to command the front wheel motor to output the power obtained by subtracting the engine output power from the driver demand power.

Fourth, when shift of the transmission starts during traveling using only the power of the front wheel motor, the controller may be configured to command the rear wheel motor to output the portion of the driver demand power corresponding to the power capable of being output by the rear wheel motor and may command the front wheel motor to output power obtained by subtracting the rear wheel motor output power from the driver demand power.

Specifically, when the maximum rear wheel motor power is equal to or greater than the driver demand power at the time of shift, the controller may be configured to command the rear wheel motor to output the driver demand power and may command the front wheel motor to output power of 0. Additionally, when the maximum rear wheel motor power is less than the driver demand power at the time of shift, the controller may be configured to command the rear wheel motor to output the maximum power capable of being output and command the front wheel motor to output power obtained by subtracting the maximum rear wheel motor power from the driver demand power.

Fifth, when the sum of maximum front wheel motor power and maximum rear wheel motor power is equal to or greater than the driver demand power and the value obtained by multiplying the maximum rear wheel motor power by operation efficiency of the decelerator is less than the value obtained by multiplying the maximum front wheel motor power by operation efficiency of the transmission, the controller may be configured to drive the front wheel motor alone during traveling.

In another aspect, the present invention provides a device for controlling driving of an electric four-wheel drive vehicle at the time of shift that may include a front wheel powertrain having an engine and a transmission configured to shift power of the engine and to output the shifted power to front wheels, a rear wheel powertrain having a rear wheel motor and a decelerator configured to decelerate power of the rear wheel motor and to output the decelerated power to rear wheels, and a controller configured to, when shift of the transmission starts during traveling through driving of the engine, command the rear wheel motor to output the portion of driver demand power corresponding to power capable of being output by the rear wheel motor and to command the engine to output power obtained by subtracting the rear wheel motor output power from the driver demand power.

Specifically, when the maximum power capable of being output by the rear wheel motor is equal to or greater than the driver demand power at the time of shift, the controller may be configured to command the rear wheel motor to output the driver demand power and stop the engine. When the maximum rear wheel motor power is less than the driver demand power at the time of shift, the controller may be configured to command the rear wheel motor to output the maximum power and may command the engine to output power obtained by subtracting the maximum rear wheel motor power from the driver demand power.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
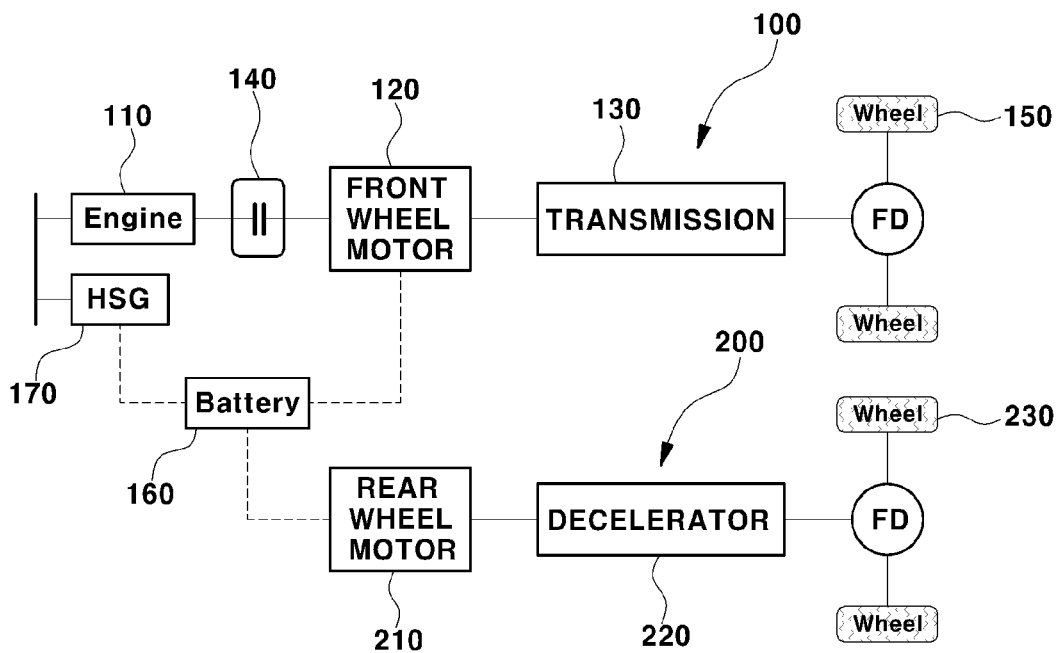
FIG. 1 is a view showing an example of a power transmission system of an electric four-wheel drive vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes, will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a preferred embodiment of the present invention will be described in detail with reference to the accompanying drawings. Items shown in the accompanying drawings are schematic and may be different from actually embodied forms.

Figure 2:
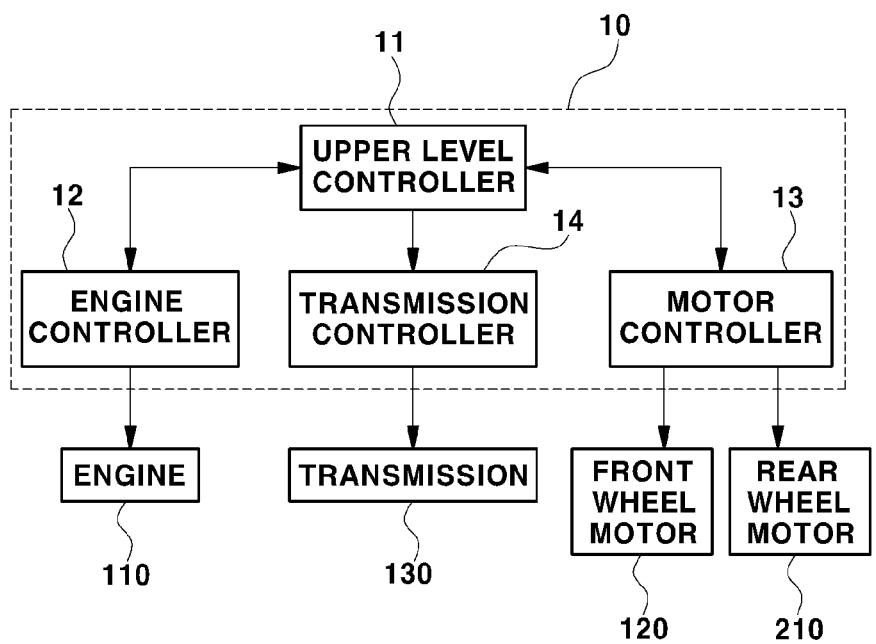
FIG. 2 is a view showing a construction for driving control at the time of shift in an electric four-wheel drive vehicle according to the present invention.

FIG. 1 is a view showing a power transmission system of an electric four-wheel drive (E-4WD) vehicle constituted by a combination of a front wheel powertrain including an engine and a front wheel motor and a rear wheel powertrain including a rear wheel motor, and FIG. 2 is a view showing a construction for driving control at the time of shift in an electric four-wheel drive vehicle according to the present invention.

As shown in FIG. 1, a front wheel powertrain 100 may include an engine 110, a front wheel motor 120, a transmission 130, and an engine clutch 140. The engine 110 and the front wheel motor 120 may be configured to output powers necessary for traveling of the vehicle. The transmission 130 may be connected to the rear end (the output end) of the front wheel motor 120 to shift the powers of the engine 110 and the front wheel motor 120 and to output the shifted powers to front wheels 150. The engine clutch 140 may be disposed between the engine 110 and the front wheel motor 120 to perform clutch operation or release operation.

More specifically, at the time of clutch operation of the engine clutch 140, engine power is transmitted to the transmission 130, and at the time of release operation of the engine clutch 140, engine power is interrupted, whereby no engine power is transmitted to the transmission 130. The transmission 130 may shift power generated by the engine 110 and the front wheel motor 120 according to a shift gear and may transmit the shifted power to the front wheels 150. For example, an automatic transmission (AT) or a dual clutch transmission (DCT) may be used as the transmission 130. Reference numeral 170 indicates a hybrid starter generator (HSG) 170 connected to a crank pulley of the engine 110 to start the engine and to generate electricity.

The front wheel motor 120 and the hybrid starter generator 170 are electrically connected to a battery 160. The battery 160 may be connected to the front wheel motor 120 and the hybrid starter generator 170 to be charged and discharged. More specifically, the battery 160 may be configured to discharge electricity to the front wheel motor 120 and the hybrid starter generator 170, or may be charged by the front wheel motor 120 and the hybrid starter generator 170. The rear wheel powertrain 200 may include a rear wheel motor 210 connected to the battery 160 to be charged and discharged and a decelerator 220 configured to decelerate power of the rear wheel motor 210 and to output the decelerated power to rear wheels 230. The rear wheel motor 210 may be driven to output power necessary for traveling of the vehicle.

In the present invention, when shift of the transmission 130 is performed during traveling of the electric four-wheel drive vehicle constituted by a combination of the front wheel powertrain 100 and the rear wheel powertrain 200, output power of the engine and the motors 120 and 210, which are configured to drive the vehicles, is controlled to minimize shift loss. Specifically, when shift starts during traveling using the engine 110 and/or the front wheel motor 120 connected to the transmission 130, power of the rear wheel motor 210, which is not connected to the transmission 130, may be maximally used, whereby it is possible to minimize energy loss occurring at the power transmission system during shift to thus improve fuel efficiency.

As shown in FIG. 2, an upper level controller 11, an engine controller 12 configured to execute overall operation of the engine 110 according to a command from the upper level controller 11, and a motor controller 13 configured to execute overall operation of the front wheel motor 120 and the rear wheel motor 210 according to a command from the upper level controller 11 may be used as a controller 10, which is a control agent of the engine 110 and the motors 120 and 210 at the time of shift in the electric four-wheel drive vehicle.

In addition, the upper level controller 11 may be configured to issue a command to a transmission controller 14 or receive information, such as a shift phase, from the transmission controller 14. The transmission controller 14 may be configured to execute operation of the transmission 130 according to a command from the upper level controller 11. The electric four-wheel drive vehicle may provide traveling modes, such as an electric vehicle (EV) mode of performing traveling using only the front wheel motor 120 and/or the rear wheel motor 210 and an engine on mode of performing traveling using power of the engine 110.

The EV mode may include a front wheel motor driving mode of performing traveling using only power of the front wheel motor 120. The engine on mode may include an engine alone driving mode of performing traveling using only power of the engine 110 and a hybrid electric vehicle (HEV) mode of using the front wheel motor 120 and/or the rear wheel motor 210 as an auxiliary power source while using the engine 110 as a main power source.

In the present invention, when shift starts during traveling using power of the front wheel powertrain 100, in which the transmission 130 is mounted, in the above traveling mode, it is possible to reduce energy loss occurring on a power transmission path. In other words, when shift starts during travelling in the front wheel motor driving mode and the engine on mode, power of the rear wheel motor 210 is maximally used, whereby it is possible to minimize shift loss.

Figure 3:
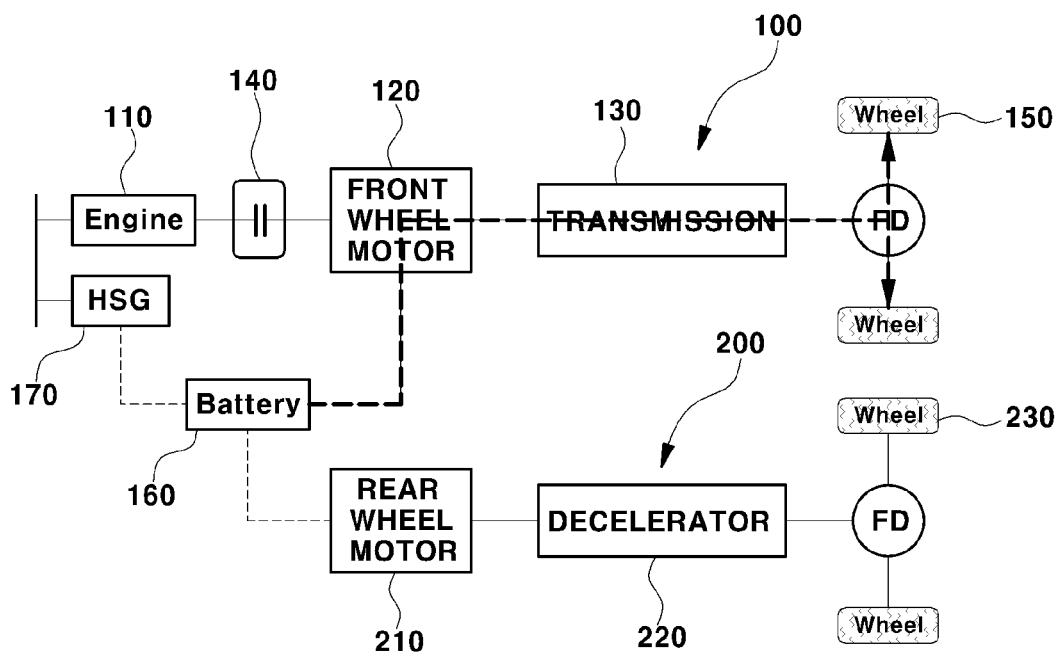
FIG. 3 is a view showing a power transmission path at the time of driving a front wheel motor in the electric four-wheel drive vehicle according to the present invention.
Figure 4:
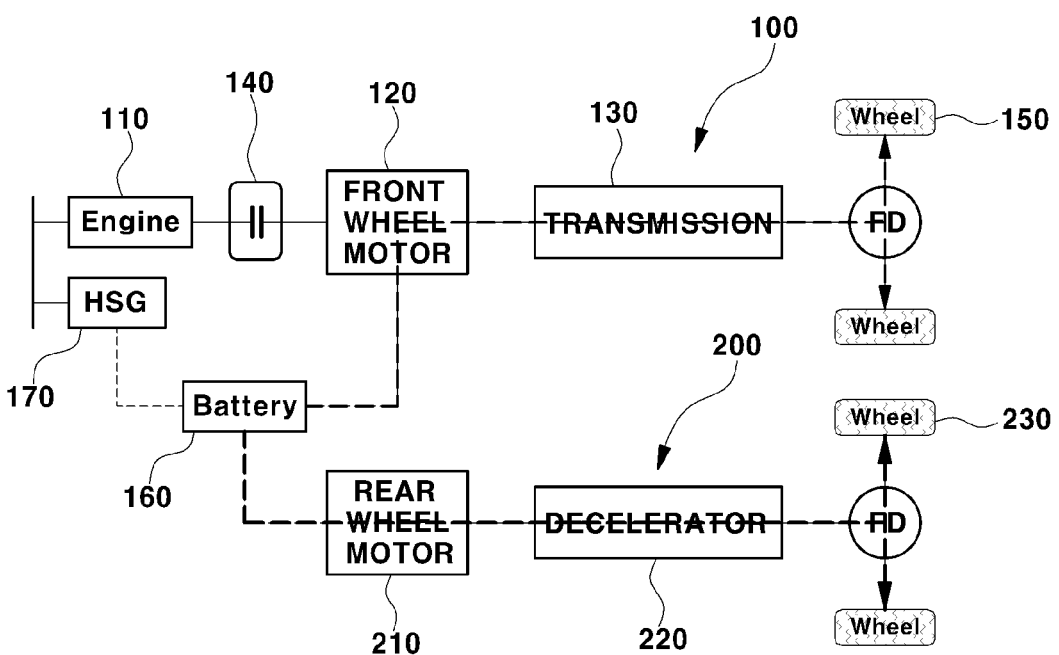
FIG. 4 is a view showing a power transmission path at the time of shift during driving of the front wheel motor in the electric four-wheel drive vehicle according to the present invention.

FIGS. 3 and 4 are views showing a power transmission path at the time of traveling in the front wheel motor driving mode. Specifically, FIG. 3 is a view showing a power transmission path before shift in the electric four-wheel drive vehicle according to the present invention, and FIG. 4 is a view showing a power transmission path at the time of shift in the electric four-wheel drive vehicle according to the present invention.

When the vehicle is being driven using the front wheel motor 120, as shown in FIG. 3, power of the front wheel motor 120 is transmitted the front wheels 150 via the transmission 130, and the front wheel motor 120 is driven using power of the battery 160. When driver demand power variable according to the accelerator depression amount (i.e. the accelerator stroke) of a driver is less than the sum of the maximum front wheel motor power and the maximum rear wheel motor power, the front wheel motor 120 and/or the rear wheel motor 210 may be driven to perform traveling in the EV mode.

The maximum front wheel motor power is the maximum power capable of being output by the front wheel motor 120, and the maximum rear wheel motor power is the maximum power capable of being output by the rear wheel motor 210. Whether to drive the front wheel motor 120 or the rear wheel motor 210 alone during traveling in the EV mode may be determined based on power transmission efficiency. In other words, one of the front wheel motor 120 and the rear wheel motor 210 may be selected and driven alone based on power transmission efficiency of the front wheel motor 120 and the rear wheel motor 210.

Power transmission efficiency of the front wheel motor 120 is power transmission efficiency when power of the front wheel motor 120 is output to the front wheels 150 via the transmission 130 and may be determined according to operation efficiency of the transmission 130. Power transmission efficiency of the rear wheel motor 210 is power transmission efficiency when power of the rear wheel motor 210 is output to the rear wheels 230 via the decelerator 220 and may be determined according to operation efficiency of the decelerator 220.

Accordingly, a first value A obtained by multiplying the maximum power of the front wheel motor 120 by operation efficiency of the transmission 130 and a second value B obtained by multiplying the maximum power of the rear wheel motor 210 by operation efficiency of the decelerator 220 are compared with each other, and when the first value A is greater than the second value B, the front wheel motor 120 alone may be driven at the time of traveling in the EV mode, which is preferable in terms of power transmission efficiency.

Additionally, when the first value A is greater than the second value B, power transmission efficiency of the front wheel powertrain 100 is improved, whereby it is possible to satisfy driver demand power through driving of the front wheel motor 120 alone. In other words, when the first value A is greater than the second value B, the value of the maximum front wheel motor power may be equal to or greater than the driver demand power.

When maximum front wheel motor power+maximum rear wheel motor power≥driver demand power and maximum rear wheel motor power×decelerator operation efficiency<maximum front wheel motor power×transmission operation efficiency, therefore, the controller 10 may be configured to drive the front wheel motor 120 alone, among the driving sources of the vehicle. For example, in response to determining that the sum of the maximum front wheel motor power and the maximum rear wheel motor power (maximum front wheel motor power+maximum rear wheel motor power) is equal to or greater than the driver demand power and in response to determining that the value obtained by multiplying the maximum front wheel motor power by operation efficiency of the transmission (maximum front wheel motor power×operation efficiency of transmission) is greater than the value obtained by multiplying the maximum rear wheel motor power by operation efficiency of the decelerator (maximum rear wheel motor power×operation efficiency of decelerator), the upper level controller 11 may be configured to request driving of the front wheel motor 120 alone from the motor controller 13, and the motor controller 13 may be configured to drive the front wheel motor 120 alone.

When shift of the transmission 130 starts during traveling using only the front wheel motor 120, among the engine 110, the front wheel motor 120, and the rear wheel motor 210, the controller 10 may be configured to command the rear wheel motor 210 to output the portion of the driver demand power that can be output by the rear wheel motor 210. At this time, the rear wheel motor 210 is requested to output power equal to or less than the maximum rear wheel motor power.

Whether shift of the transmission 130 starts may be determined based on the shift phase. When the shift phase of the transmission 130 is equal to or greater than a predetermined first phase $\alpha$ during traveling through driving of the front wheel motor 120 alone, the controller 10 may be configured to determine that shift of the transmission 130 starts. For example, when the value of the shift phase received from the transmission controller 14 is equal to or greater than the first phase $\alpha$, the upper level controller 11 may be configured to determine that shift of the transmission 130 starts.

The first phase $\alpha$ may be set to 1, which is generally used, but may be set to a value other than 1 according to torque reduction speed of the front wheel motor 120 at the time of shift. For example, when torque of the front wheel motor 120 is capable of being relatively rapidly reduced at the time of shift, the first phase $\alpha$ may be set to a value other than 1.

In response to determining that shift starts based on shift phase information of the transmission 130, the controller 10 may be configured to compare the maximum rear wheel motor power with the driver demand power. When the maximum rear wheel motor power is equal to or greater than the driver demand power, the rear wheel motor 210 may be operated to output the driver demand power, since the rear wheel motor 210 may output power satisfying the driver demand power. In other words, when the maximum rear wheel motor power is equal to or greater than the driver demand power, a command for requesting to output power having the same value as the driver demand power may be transmitted to the rear wheel motor 210, and a command for requesting to output power of 0 may be transmitted to the front wheel motor 120.

When the maximum rear wheel motor power is less than the driver demand power, the rear wheel motor 210 may be operated to output the maximum power, since the rear wheel motor 210 is unable to output the entirety of the driver demand power, and the front wheel motor 120 may be operated to output the power obtained by subtracting the maximum rear wheel motor power from the driver demand power (driver demand power−maximum rear wheel motor power).

In other words, when the maximum rear wheel motor power is less than the driver demand power, the rear wheel motor 210 may be operated to output the maximum rear wheel motor power, and the front wheel motor 120 may be operated to output the power obtained by subtracting the maximum rear wheel motor power from the driver demand power, by the controller 10. As a result, as shown in FIG. 4, the maximum rear wheel motor power may be output to the rear wheels 230 via the decelerator 220, and the front wheel motor output power may be output to the front wheels 150 via the transmission 130.

As described above, the front wheel motor output power may be adjusted to 0 or the front wheel motor output power may be adjusted to a power value less than the power value before shift at the time of shift, whereby it is possible to minimize shift loss.

Figure 5:
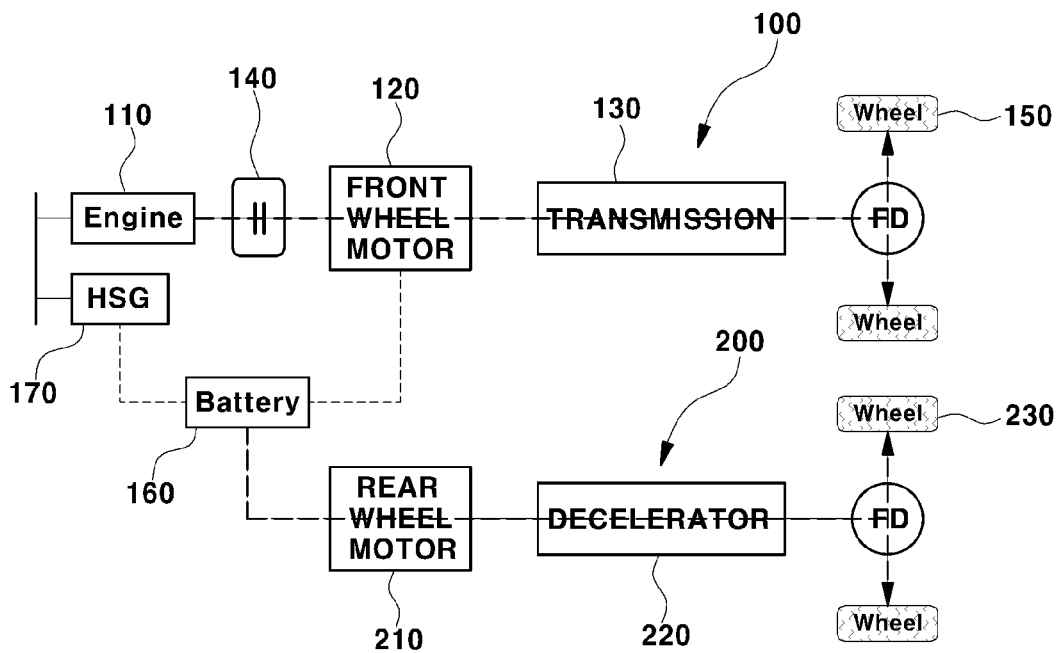
FIG. 5 is a view showing a power transmission path at the time of traveling in an engine on mode in the electric four-wheel drive vehicle according to the present invention.
Figure 6:
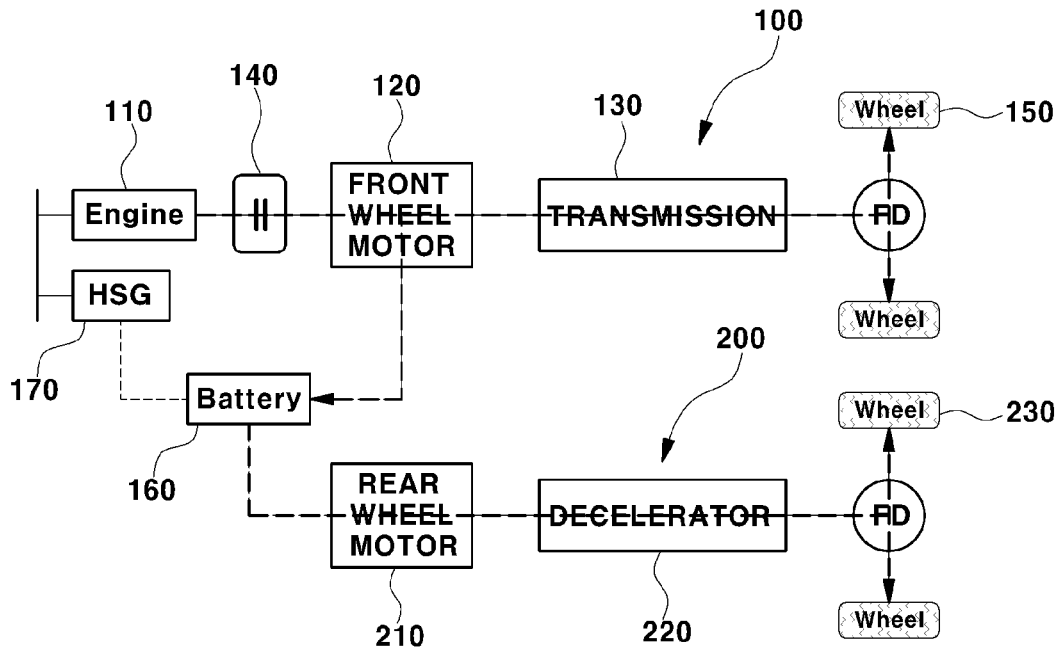
FIG. 6 is a view showing a power transmission path at the time of shift during traveling in the engine on mode in the electric four-wheel drive vehicle according to the present invention.

FIGS. 5 and 6 are views showing a power transmission path at the time of traveling in the engine on mode. Specifically, FIG. 5 is a view showing a power transmission path before shift in the electric four-wheel drive vehicle according to the present invention, and FIG. 6 is a view showing a power transmission path at the time of shift in the electric four-wheel drive vehicle according to the present invention.

When the driver demand power is greater than the sum of the maximum front wheel motor power and the maximum rear wheel motor power (maximum front wheel motor power+maximum rear wheel motor power), the controller 10 may be configured to operate the engine 110 to satisfy the driver demand power. For example, when the driver demand power is greater than the sum of the maximum front wheel motor power and the maximum rear wheel motor power, the upper level controller 11 may be configured to request driving of the engine 110 from the engine controller 12, and the engine controller 12 may be configured to operate the engine 110 according to a predetermined optimal operating line (OOL) condition.

In response to receiving a command, the engine 110 may be configured to output power determined according to the optimal operating line condition, and the front wheel motor 120 may be requested to output the power obtained by subtracting the power output by the engine 110 (i.e. engine output power) from the driver demand power (driver demand power−engine output power).

At this time, when the power requested from the front wheel motor 120 is a positive (+) value, the front wheel motor 120 may be driven while discharging the battery 160 to output power to the front wheels 150. When the power requested from the front wheel motor 120 is a negative (−) value, the front wheel motor 120 may be operated in an electricity generation mode to charge the battery 160.

The optimal operating line, which is a value for improving fuel efficiency, may be preset and stored in the engine controller 12. For example, an operating line map configured to determine the optimal engine torque at which engine efficiency is maximized according to rotational speed (RPM) of the engine may be stored in the engine controller 12. The engine controller 12 may be configured to adjust the driving of the engine 110 at the optimal operating line (i.e. the optimal torque value) determined through the operating line map according to a command from the upper level controller 11.

When the vehicle is being driven in the engine on mode of using power of the engine 110, as shown in FIG. 5, power of the engine 110 is transmitted to the front wheels 150 via the transmission 130. When shift of the transmission 130 starts during traveling in the engine on mode using power of the engine 110 or power of the engine 110 and the front wheel motor 120 or when shift of the transmission 130 starts during traveling in the engine on mode using power of the engine 110, the front wheel motor 120, and the rear wheel motor 210, as shown in FIG. 5, the controller 10 may be configured to command the rear wheel motor 210 to output power that can be output by the rear wheel motor 210, and the battery 160 is charged using the engine power, whereby it is possible to minimize torque input to the transmission 130.

As previously described, whether shift of the transmission 130 starts may be determined based on the shift phase. When the shift phase of the transmission 130 is equal to or greater than a predetermined second phase β during traveling in the engine on mode, the controller 10 may be configured to determine that shift of the transmission 130 starts. For example, when the value of the shift phase received from the transmission controller 14 is equal to or greater than the second phase β, the upper level controller 11 may be configured to determine that shift of the transmission 130 starts.

The second phase β may be set to 1, which is generally used, but may be set to a value other than 1 according to torque reduction speed of the engine 110 at the time of shift. For example, when torque of the engine 110 is capable of being relatively rapidly reduced at the time of shift, the second phase β may be set to a value other than 1.

When shift of the transmission 130 starts during traveling in the engine on mode, the controller 10 may be configured to request the rear wheel motor 210 to output predetermined power based on the result of comparison between the maximum rear wheel motor power and the driver demand power. Specifically, when the maximum rear wheel motor power is equal to or greater than the driver demand power, the controller 10 may be configured to request the driver demand power from the rear wheel motor 210 and operate the rear wheel motor 210 to output power corresponding to the driver demand power. When the maximum rear wheel motor power is less than the driver demand power, the controller 10 may be configured to request the maximum power from the rear wheel motor 210 and operate the rear wheel motor 210 to output the maximum power.

When the driver demand power is requested from the rear wheel motor 210, the engine 110 may be configured to receive a command for outputting the optimal power determined according to the optimal operating line condition, and the front wheel motor 120 receives a command for outputting the power obtained by subtracting the rear wheel motor output power and the engine output power from the driver demand power (driver demand power−rear wheel motor output power−engine output power).

At this time, since the rear wheel motor output power is power having the same value as the driver demand power (rear wheel motor output power−driver demand power), the front wheel motor 120 may be requested to output the same power as engine output power having a negative (−) value, and therefore the front wheel motor 120 may be configured to charge the battery 160 using the engine output power. In other words, the front wheel motor 120 may be operated as an electric generator by the engine output power to charge the battery 160.

For example, when the maximum rear wheel motor power is equal to or greater than the driver demand power, the upper level controller 11 may be configured to command the motor controller 13 to request the rear wheel motor 210 to output the driver demand power and to request the front wheel motor 120 to output engine output power having a negative (−) value. The motor controller 13 may be configured to command the rear wheel motor 210 to output the driver demand power and command the front wheel motor 120 to generate electricity for charging the battery 160 using the engine output power.

When the rear wheel motor 210 outputs the entirety of the driver demand power, therefore, the power output by the engine 111 (i.e. the engine output power) is not output to the front wheels 150 but is applied to the front wheel motor 120, and the front wheel motor 120 charges the battery 160 using the engine output power. In addition, the rear wheel motor output power may be transmitted to the rear wheels 230 via the decelerator 220.

Additionally, when shift starts and the rear wheel motor 210 is requested to output the maximum power, the engine 110 may be requested to output the output power determined according to the operating line map, and the front wheel motor 120 may be requested to output the power obtained by subtracting the maximum rear wheel motor power and the engine output power from the driver demand power (driver demand power−maximum rear wheel motor power−engine output power).

When the rear wheel motor 210 is unable to output the entirety of the driver demand power at the time of shift, the power that is unable to be output by the rear wheel motor 210 (i.e. the difference between the driver demand power and the maximum rear wheel motor power) is filled with the engine output power. In other words, when the maximum rear wheel motor power is less than the driver demand power, at least a portion of the engine output power may be transmitted to the front wheels 150 via the transmission 130. At this time, the power transmitted to the front wheels 150 may be determined to be the power obtained by subtracting the maximum rear wheel motor power from the driver demand power (driver demand power−maximum rear wheel motor power).

Consequently, the power obtained by subtracting the engine output power from the power transmitted to the front wheels 150 (hereinafter referred to as "front wheel transmission power") (front wheel transmission power−engine output power) may be requested from the front wheel motor 120. When the power obtained by subtracting the engine output power from the front wheel transmission power has a negative (−) value, i.e. when the sum of the maximum rear wheel motor power and the engine output power is greater than the driver demand power, the front wheel motor 120 may be configured to charge the battery 160 using the power obtained by subtracting the front wheel transmission power from the engine output power (engine output power−front wheel transmission power).

More specifically, when the sum of the powers requested from the rear wheel motor 210 and the engine 110 (maximum rear wheel motor power+engine output power) is greater than the driver demand power at the time of shift of the transmission 130, the controller 10 may be configured to command the front wheel motor 120 to generate electricity for charging the battery 160. At this time, the front wheel motor 120 may be configured to generate electricity for charging the battery 160 using the power obtained by subtracting the maximum rear wheel motor power and the engine output power from the driver demand power (driver demand power−maximum rear wheel motor power−engine output power).

For example, when the maximum rear wheel motor power is less than the driver demand power, the upper level controller 11 may be configured to command the motor controller 13 to request the rear wheel motor 210 to output the maximum power and to request the front wheel motor 120 to output the power obtained by subtracting the engine output power from the front wheel transmission power (front wheel transmission power−engine output power). The motor controller 13 may be configured to command the rear wheel motor 210 to output the maximum power and command the front wheel motor 120 to charge the battery 160 with the power obtained by subtracting the front wheel transmission power from the engine output power (engine output power−front wheel transmission power).

Consequently, when the rear wheel motor 210 outputs the maximum power, as shown in FIG. 6, a portion of the power output by the engine 110 (i.e. the front wheel transmission power) may be transmitted to the front wheels 150, the remaining power (engine output power−front wheel transmission power) may be used by the front wheel motor 120 to charge the battery 160. At this time, the maximum rear wheel motor power may be output to the rear wheels 230 via the decelerator 220. When shift of the transmission 130 starts during traveling in the engine on mode, as described above, the rear wheel motor 210 may be configured to output as much traveling power as possible, and the rear wheel motor 210 may be configured to output increased traveling power than the engine 110.

Figure 7A:
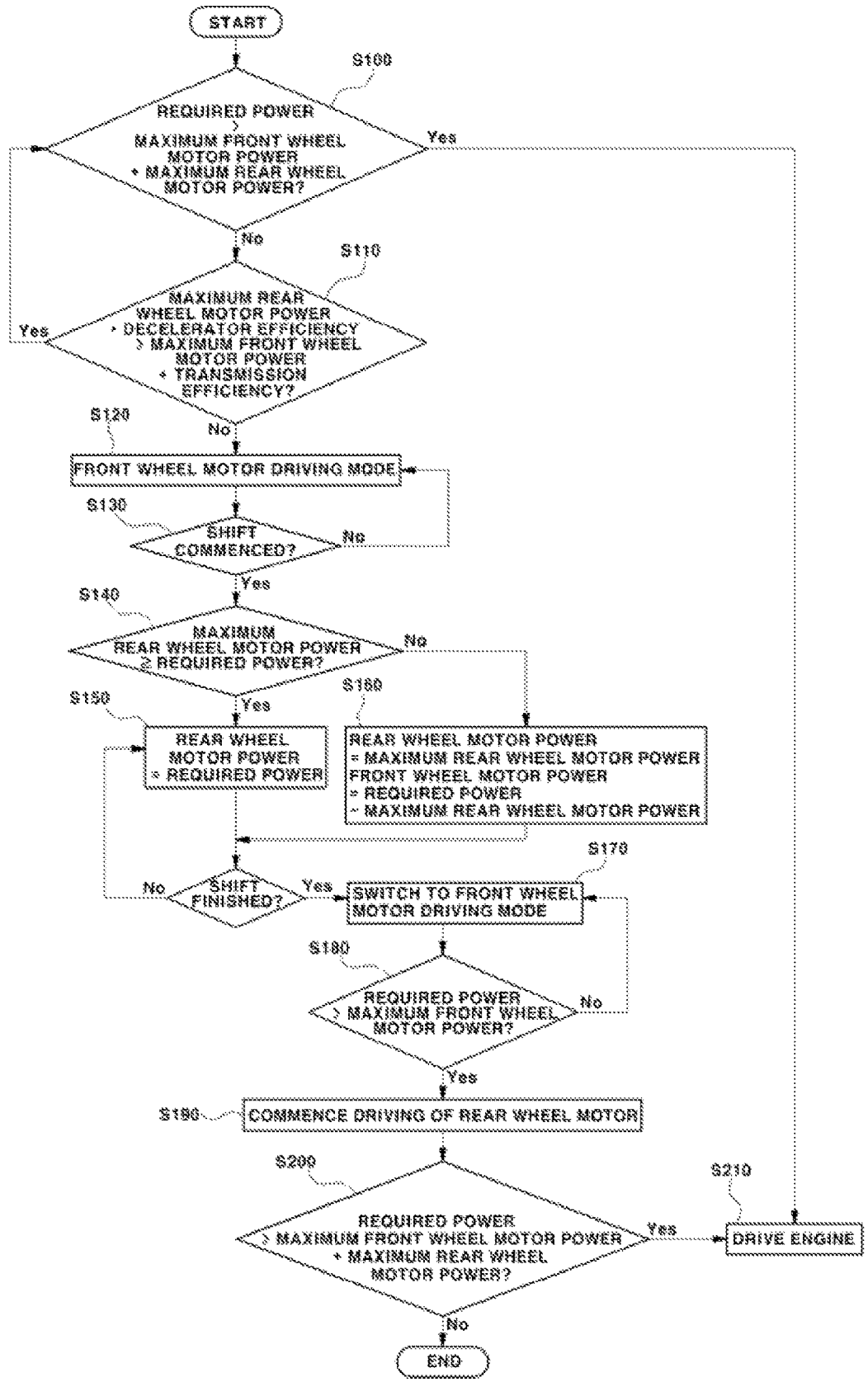
FIGS. 7A and 7B are flowcharts showing a driving control process at the time of shift in the electric four-wheel drive vehicle according to the present invention.
Figure 7B:
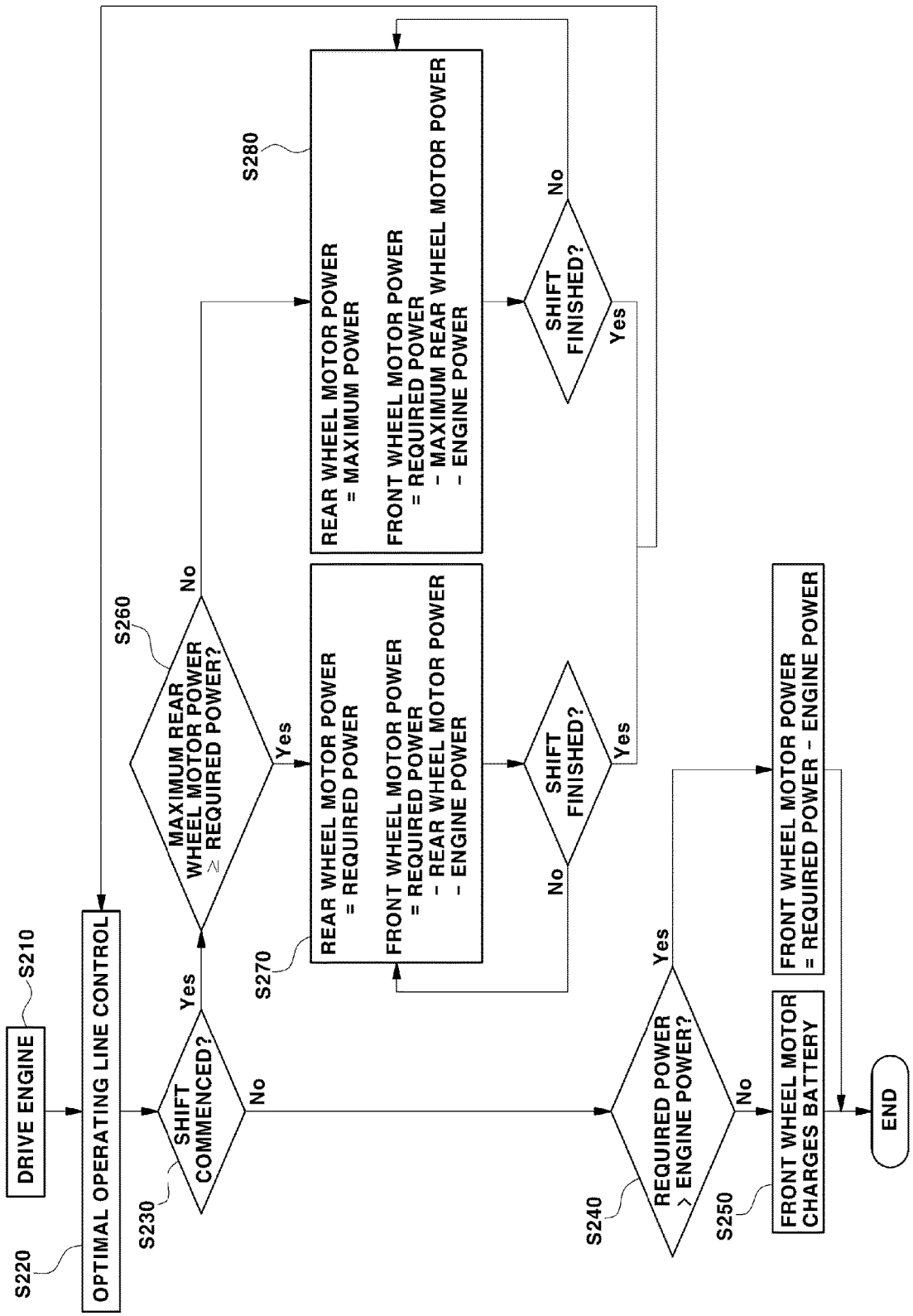

Hereinafter, a driving control method at the time of shift in the electric four-wheel drive vehicle according to the present invention will be described with reference to FIGS. 7A and 7B. FIGS. 7A and 7B are flowcharts showing a driving control method at the time of shift in the electric four-wheel drive vehicle according to the present invention. However, the driving control method at the time of shift according to the present invention is not limited to the sequence shown in FIGS. 7A and 7B.

Referring to FIG. 7A, first, the driver demand power may be compared with the sum of the maximum front wheel motor power and the maximum rear wheel motor power (maximum front wheel motor power+maximum rear wheel motor power) (S100). When the driver demand power is greater than the sum of the maximum front wheel motor power and the maximum rear wheel motor power, the engine 110 may be driven (S210).

When the driver demand power is equal to or less than the sum of the maximum front wheel motor power and the maximum rear wheel motor power, a first value obtained by multiplying the maximum front wheel motor power by transmission operation efficiency (maximum front wheel motor power×transmission operation efficiency) and a second value obtained by multiplying the maximum rear wheel motor power by decelerator operation efficiency (maximum rear wheel motor power×decelerator operation efficiency) may be compared with each other (S110).

When the first value is greater than the second value, the front wheel motor 120 alone, among the driving sources of the vehicle, may be driven to perform traveling in the EV mode (S120). Whether shift of the transmission 130 starts during driving of the front wheel motor 120 alone may be determined (S130). When shift of the transmission 130 starts, the maximum rear wheel motor power may be compared with the driver demand power (S140).

When the maximum rear wheel motor power is equal to or greater than the driver demand power, the rear wheel motor 210 may be configured to output power having the same value as the driver demand power until shift is completed (S150) and the front wheel motor 120 may be configured to output power of 0 to minimize shift loss. When the maximum rear wheel motor power is less than the driver demand power, the rear wheel motor 210 may be configured to output the maximum power and the front wheel motor 120 may be configured to output the power obtained by subtracting the maximum rear wheel motor power from the driver demand power (driver demand power−maximum rear wheel motor power) until shift is completed (S160) to reduce energy loss occurring at the transmission 130.

When shift of the transmission 130 is completed, the vehicle driving mode may be switched to the front wheel motor driving mode again (S170), and the driver demand power and the maximum front wheel motor power may be compared with each other (S180). When the driver demand power is equal to or less than the maximum front wheel motor power, the front wheel motor driving mode may be maintained. When the driver demand power is greater than the maximum front wheel motor power, the rear wheel motor 210 may be driven (S190).

When driving of the rear wheel motor 210 starts, the driver demand power may be compared with the sum of the maximum front wheel motor power and the maximum rear wheel motor power (S200). When the driver demand power is greater than the sum of the maximum front wheel motor power and the maximum rear wheel motor power, the engine 110 may be driven (S210), since the driver demand power is unable to be output through driving of the motors 120 and 210 alone.

Referring to FIG. 7B, the engine 110 may be driven to output power capable of maximizing engine efficiency according to optimal operating line control (S220). When the engine 110 is driven, whether shift of the transmission 130 starts may be determined (S230). When no shift of the transmission 130 starts, the driver demand power may be compared with the engine output power according to the optimal operating line control (S240).

When no shift of the transmission 130 starts, the front wheel motor 120 may be configured to output the power obtained by subtracting the engine output power from the driver demand power. When the driver demand power is less than the engine output power, the front wheel motor 120 may be configured to charge the battery 160 electrically connected to the front wheel motor 120 according to a command of the controller 10 (S250). At this time, the front wheel motor 120 may be configured to generate electricity using the power obtained by subtracting the driver demand power from the engine output power. When the driver demand power is greater than the engine output power, the front wheel motor 120 may be configured to output the power obtained by subtracting the engine output power from the driver demand power according to a command of the controller 10. At this time, the front wheel motor 120 may be driven using the power of the battery 160, and the front wheel motor output power may be transmitted to the front wheels 150 via the transmission 130.

In response to determining that shift of the transmission 130 starts at the result of comparison in step S230, the maximum rear wheel motor power may be compared with the driver demand power (S260). When the maximum rear wheel motor power is equal to or greater than the driver demand power, the rear wheel motor 210 may be configured to output the driver demand power, since the rear wheel motor 210 is able to output the driver demand power, and the front wheel motor 120 may be configured to output the power obtained by subtracting the rear wheel motor output power and the engine output power from the driver demand power (S270). At this time, the front wheel motor 120 may be configured to charge the battery 160 using the engine output power, since the rear wheel motor output power has the same power value as the driver demand power.

Until shift of the transmission 130 is completed, the rear wheel motor 210 may be configured to output the driver demand power, and the front wheel motor 120 may be configured to charge the battery 160 using the engine output power. When the maximum rear wheel motor power is less than the driver demand power, the rear wheel motor 210 may be requested to output the maximum power, since the rear wheel motor 210 is unable to completely output the driver demand power, and at least a portion of the engine output power may be transmitted to the front wheels 150 (S280). At this time, the engine power transmitted to the front wheels 150 (i.e. the front wheel transmission power) may be determined to be the power obtained by subtracting the maximum rear wheel motor power from the driver demand power (driver demand power−maximum rear wheel motor power).

At this time, the front wheel motor 120 may be requested to output the power obtained by subtracting the maximum rear wheel motor power and the engine output power from the driver demand power (driver demand power−maximum rear wheel motor power−engine output power) (S280). Accordingly, the front wheel motor 120 uses the power obtained by subtracting the power transmitted to the front wheels 150 from the engine output power (engine output power−front wheel transmission power) to charge the battery.

For example, the motor controller 13 may be configured to control battery charging operation of the front wheel motor 120 according to a command of the upper level controller 11. At this time, the engine power that the front wheel motor 120 uses to charge the battery may be adjusted such that at least a portion of the engine output power is transmitted to the front wheels 150. Until shift of the transmission 130 is completed, the rear wheel motor 210 may be configured to output the maximum power, and the front wheel motor 120 charges the battery 160 using the power obtained by subtracting the front wheel transmission power from the engine output power (engine output power−front wheel transmission power).

Figure 8:
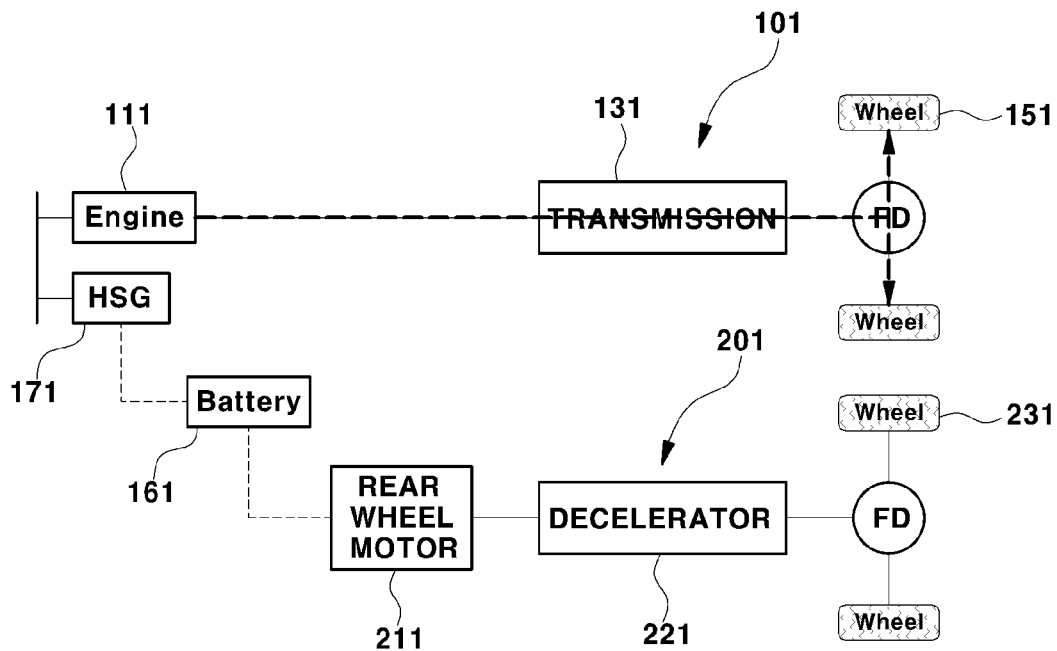
FIGS. 8 and 9 are views showing another example of the power transmission system of the electric four-wheel drive vehicle.
Figure 9:
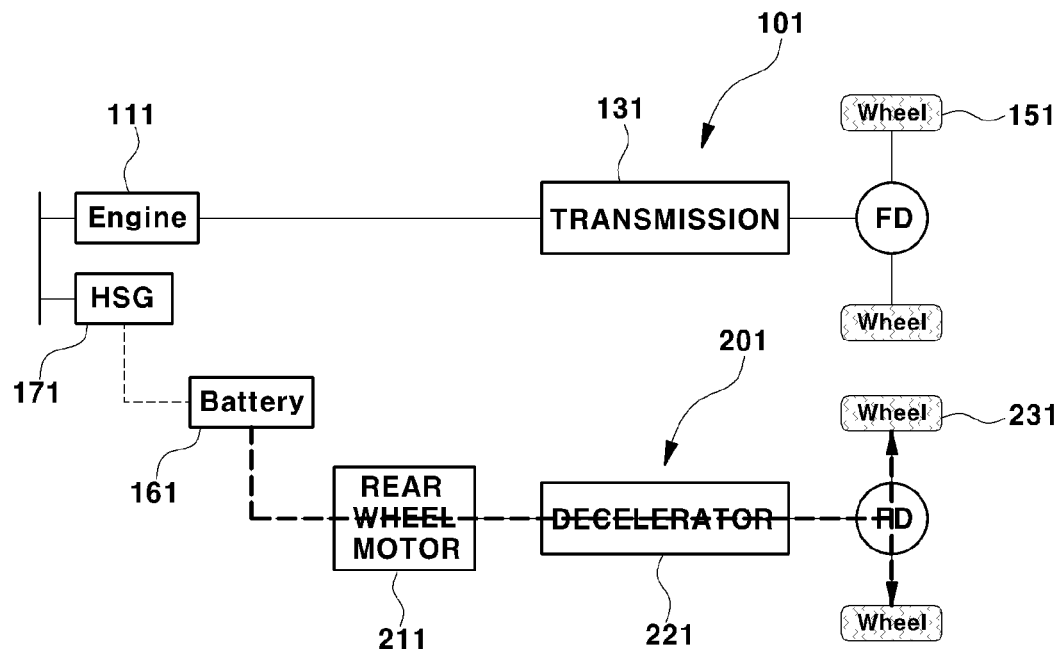

Meanwhile, FIGS. 8 and 9 are views showing another example of the power transmission system of the electric four-wheel drive vehicle. Arrows shown in FIG. 8 indicate a power transmission path before shirt during traveling in the engine on mode, and arrows shown in FIG. 9 indicate a power transmission path during shirt. Referring to FIG. 8, the electric four-wheel drive vehicle may include a power transmission system formed by a combination of a front wheel powertrain 101 including an engine 111 and a rear wheel powertrain 201 including a rear wheel motor 211.

Specifically, the front wheel powertrain 101 may include an engine 111 and a transmission 131 configured to shift power of the engine 111 and to output the shifted power to front wheels 151, but includes no front wheel motor. The rear wheel powertrain 201 may include a rear wheel motor 211 and a decelerator 221 configured to decelerate power of the rear wheel motor 211 and to output the decelerated power to rear wheels 231.

Even when the vehicle includes the front wheel powertrain 101 and the rear wheel powertrain 201, the rear wheel motor 211 may be commanded to maximally output power at the time of shift during traveling, whereby it is possible to minimize shift loss. In other words, when shift starts during traveling using the engine 111 connected to the transmission 131, traveling driving force may be maximally generated through the rear wheel motor 211, which is not connected to the transmission 131, whereby it is possible to minimize energy loss occurring at the power transmission system during shift and to improve fuel efficiency.

When the front wheel powertrain 101 includes no front wheel motor, as shown in FIG. 8, battery charging using the front wheel motor is not possible, but engine power transmitted to the front wheels 151 via the transmission 131 is reduced, whereby it is possible to reduce shift loss. When shift of the transmission 141 is not performed in the vehicle, based on driver demand power variable according to the accelerator depression amount of the driver, the driver demand power may be requested from the engine 111 or power determined according to the optimal engine operating line may be requested from the engine 111.

At this time, when the engine cannot output the entirety of the driver demand power, the power obtained by subtracting the engine output power from the driver demand power (driver demand power−engine output power) may be requested from the rear wheel motor 211. When shift of the transmission 131 starts during traveling using the power of the engine 110 and/or the powers of the engine 111 and the rear wheel motor 211, as described above, i.e. during traveling in the engine on mode, the controller 10 may be configured to compare the maximum rear wheel motor power with the driver demand power, and request power capable of being output by the rear wheel motor 211 from the rear wheel motor 211 according to the result of comparison.

When the maximum rear wheel motor power is equal to or greater than the driver demand power, the controller 10 may be configured to command the rear wheel motor 211 to output the driver demand power and request the engine 111 to output power of 0 to stop the engine 111, as shown in FIG. 9, since the rear wheel motor 211 is capable of outputting power corresponding to the driver demand power.

When the maximum rear wheel motor power is less than the driver demand power, the controller 10 may be configured to command the rear wheel motor 211 to output the maximum power and commands the engine 111 to output the power obtained by subtracting the maximum rear wheel motor power from the driver demand power (driver demand power−maximum rear wheel motor power), since the rear wheel motor 211 is unable to output the entirety of the driver demand power.

As described above, it may be possible to minimize power transmitted to the front wheels 151 via the transmission 131 at the time of shift, whereby it is possible to reduce energy loss occurring at the power transmission system during shift. As is apparent from the foregoing, according to the present invention, it may be possible to minimize energy loss occurring on the power transmission path at the time of shift to thus improve fuel efficiency. In addition, most shift shock due to torque intervention during shift is removed, whereby it is possible to improve marketability.

The effects of the present invention are not limited to those mentioned above, and other unmentioned effects will be clearly understood by an ordinary skilled person from the above description. It will be apparent to a person of ordinary skill in the art that the present invention described above is not limited to the above embodiments and the accompanying drawings and that various substitutions, modifications, and variations can be made without departing from the technical idea of the present invention.

What is claimed is:

1. A device for controlling driving of an electric four-wheel drive vehicle at the time of shift, comprising:
   a front wheel powertrain including an engine, a front wheel motor, and a transmission configured to shift powers of the engine and the front wheel motor and to output the shifted powers to front wheels;
   a rear wheel powertrain including a rear wheel motor and a decelerator configured to decelerate power of the rear wheel motor and to output the decelerated power to rear wheels; and
   a controller configured to,
   when shift of the transmission starts during traveling through driving of the engine,
      command the rear wheel motor to output a portion of driver demand power corresponding to power capable of being output by the rear wheel motor; and
      command the front wheel motor to output power obtained by subtracting the output power commanded to the rear wheel motor and engine output power from the driver demand power; and
   in response to determining that a sum of maximum power capable of being output by the front wheel motor and maximum power capable of being output by the rear wheel motor is less than the driver demand power, drive the engine and command the engine to output power determined according to an operating line map.

2. The device according to claim 1, wherein:
in response to determining that the driver demand power is greater than the maximum power capable of being output by the rear wheel motor at the time of shift, the controller is configured to command the rear wheel motor to output the maximum power, and
the engine output power output by the engine, which corresponds to power obtained by subtracting the maximum rear wheel motor power from the driver demand power, is output to the front wheels.

3. The device according to claim 2, further comprising:
a battery connected to the front wheel motor and the rear wheel motor to be charged and discharged,
wherein in response to determining that a sum of the maximum rear wheel motor power and the engine output power is greater than the driver demand power at the time of shift, the controller is configured to command the front wheel motor to generate electricity for charging the battery, and
wherein the front wheel motor is configured to generate electricity for charging the battery using power obtained by subtracting the maximum rear wheel motor power and the engine output power from the driver demand power.

4. The device according to claim 3, wherein:
in response to determining that the driver demand power is equal to or less than the maximum rear wheel motor power at the time of shift, the controller is configured to command the rear wheel motor to output the driver demand power and command the front wheel motor to generate electricity for charging the battery, and
the front wheel motor is configured to generate electricity for charging the battery using the engine output power.

5. The device according to claim 3, wherein, in response to determining that no shift of the transmission is performed during traveling through driving of the engine, the controller is configured to command the front wheel motor to output power obtained by subtracting the engine output power from the driver demand power.

6. The device according to claim 5, wherein, in response to determining that the driver demand power is less than the engine output power, the controller is configured to command the front wheel motor to generate electricity for charging the battery, and the front wheel motor is configured to generate electricity for charging the battery using power obtained by subtracting the engine output power from the driver demand power.

7. The device according to claim 5, wherein, in response to determining that the driver demand power is greater than the engine output power, the controller is configured to command the front wheel motor to output the power obtained by subtracting the engine output power from the driver demand power.

8. The device according to claim 1, wherein, when shift of the transmission starts during traveling using only the power of the front wheel motor, the controller is configured to command the rear wheel motor to output the portion of the driver demand power corresponding to the power capable of being output by the rear wheel motor and command the front wheel motor to output power obtained by subtracting the rear wheel motor output power from the driver demand power.

9. The device according to claim 8, wherein, in response to determining that the maximum rear wheel motor power is equal to or greater than the driver demand power at the time of shift, the controller is configured to command the rear wheel motor to output the driver demand power.

10. The device according to claim 9, wherein, in response to determining that the maximum rear wheel motor power is equal to or greater than the driver demand power at the time of shift, the controller is configured to command the front wheel motor to output power of 0.

11. The device according to claim 9, wherein, in response to determining that the maximum rear wheel motor power is less than the driver demand power at the time of shift, the controller is configured to command the rear wheel motor to output maximum power capable of being output and command the front wheel motor to output power obtained by subtracting the maximum rear wheel motor power from the driver demand power.

12. The device according to claim 8, wherein, in response to determining that a sum of maximum front wheel motor power and maximum rear wheel motor power is equal to or greater than the driver demand power and a value obtained by multiplying the maximum rear wheel motor power by operation efficiency of the decelerator is less than a value obtained by multiplying the maximum front wheel motor power by operation efficiency of the transmission, the controller is configured to drive the front wheel motor alone during traveling.

13. A device for controlling driving of electric four-wheel drive vehicle at the time of shift, comprising:
a front wheel powertrain including an engine and a transmission configured to shift power of the engine and to output the shifted power to front wheels;
a rear wheel powertrain including a rear wheel motor and a decelerator configured to decelerate power of the rear wheel motor and to output the decelerated power to rear wheels; and
a controller configured to,
when shift of the transmission starts during traveling through driving of the engine,
command the rear wheel motor to output a portion of driver demand power corresponding to power capable of being output by the rear wheel motor; and
command the engine to output power obtained by subtracting the rear wheel motor output power from the driver demand power; and
in response to determining that maximum power capable of being output by the rear wheel motor is equal to or greater than the driver demand power at the time of shift, command the rear wheel motor to output the driver demand power and stop the engine.

14. The device according to claim 13, wherein, in response to determining that the maximum rear wheel motor power is less than the driver demand power at the time of shift, the controller is configured to command the rear wheel motor to output the maximum power and command the engine to output power obtained by subtracting the maximum rear wheel motor power from the driver demand power.

15. A device for controlling driving of an electric four-wheel drive vehicle at the time of shift, comprising:
a front wheel powertrain including an engine, a front wheel motor, and a transmission configured to shift powers of the engine and the front wheel motor and to output the shifted powers to front wheels;
a rear wheel powertrain including a rear wheel motor and a decelerator configured to decelerate power of the rear wheel motor and to output the decelerated power to rear wheels; and
a controller configured to,
when shift of the transmission starts during traveling through driving of the engine,
command the rear wheel motor to output a portion of driver demand power corresponding to power capable of being output by the rear wheel motor; and
command the front wheel motor to output power obtained by subtracting the output power commanded to the rear wheel motor and engine output power from the driver demand power;
when shift of the transmission starts during traveling using only the power of the front wheel motor, command the rear wheel motor to output the portion of the driver demand power corresponding to the power capable of being output by the rear wheel motor and command the front wheel motor to output power obtained by subtracting the rear wheel motor output power from the driver demand power; and
in response to determining that the maximum rear wheel motor power is equal to or greater than the driver demand power at the time of shift, command the rear wheel motor to output the driver demand power.

16. The device according to claim 15, wherein, in response to determining that the maximum rear wheel motor power is equal to or greater than the driver demand power at the time of shift, the controller is further configured to command the front wheel motor to output power of 0.

17. The device according to claim 15, wherein, in response to determining that the maximum rear wheel motor power is less than the driver demand power at the time of shift, the controller is further configured to command the rear wheel motor to output maximum power capable of being output and command the front wheel motor to output power obtained by subtracting the maximum rear wheel motor power from the driver demand power.

18. The device according to claim 15, wherein, in response to determining that a sum of maximum front wheel motor power and maximum rear wheel motor power is equal to or greater than the driver demand power and a value obtained by multiplying the maximum rear wheel motor power by operation efficiency of the decelerator is less than a value obtained by multiplying the maximum front wheel motor power by operation efficiency of the transmission, the controller is configured to drive the front wheel motor alone during traveling.

* * * * *